United States Patent [19]
Doty

[11] 3,863,160
[45] Jan. 28, 1975

[54] METHOD AND APPARATUS FOR FINDING THE CENTER AMPLITUDE OF EACH PULSE OF A TRAIN OF RANDOM AMPLITUDE ASYMMETRIC PULSES

[76] Inventor: Edward Neal Doty, 1240 Stardust, Pompano Beach, Fla. 33063

[22] Filed: May 7, 1973

[21] Appl. No.: 357,930

[52] U.S. Cl. .................... 328/117, 328/55, 328/58, 328/61, 328/127, 328/151, 324/188
[51] Int. Cl. .............................................. H03k 5/20
[58] Field of Search .......... 328/111, 112, 116, 117, 328/55, 58, 61, 127, 151; 307/232, 234, 235; 324/188

[56] References Cited
UNITED STATES PATENTS

| | | | |
|---|---|---|---|
| 3,280,346 | 10/1966 | Schoute | 307/235 X |
| 3,345,575 | 10/1967 | Van Der Lans | 328/117 X |
| 3,370,228 | 2/1968 | Mills | 328/112 X |
| 3,505,537 | 4/1970 | Giordano | 307/236 X |
| 3,733,548 | 5/1973 | Coulter et al. | 328/112 X |
| 3,760,281 | 9/1973 | Hogg | 328/117 X |

Primary Examiner—John S. Heyman
Attorney, Agent, or Firm—Silverman & Cass, Ltd.

[57] ABSTRACT

The pulses produced by a Coulter type of electronic particle analyzer having a scanning aperture have amplitudes proportional to the particle volumes; hence, random in amplitude. The pulses are variably asymmetric due to the particle scanning aperture and particle flow arrangement. The most reliable measure of particle volume is pulse amplitude at the time when the particle is halfway through the scanning aperture path. By attenuating each pulse to the same predetermined percentage of its amplitude and comparing the attenuated signal level with the original pulse in two different time spaced channels, there results two equal rectangular time-spaced pulses that separately then are integrated and compared. If the integration durations are equal, but one integral signal is attenuated to one half, then the two time-spaced integral signals will have equal amplitudes at the time center of the rectangular pulse, the symmetric time center of the original pulse. Adjustment of the slope of integration and/or attenuation of one integral signal can shift the time position. In this manner the amplitude of the particle-pulse can be strobed at its aperture path center time.

27 Claims, 4 Drawing Figures

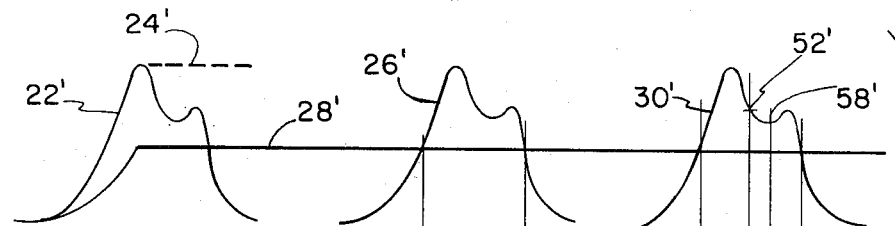
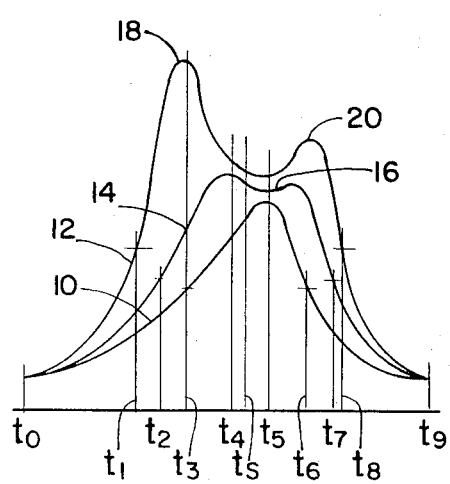
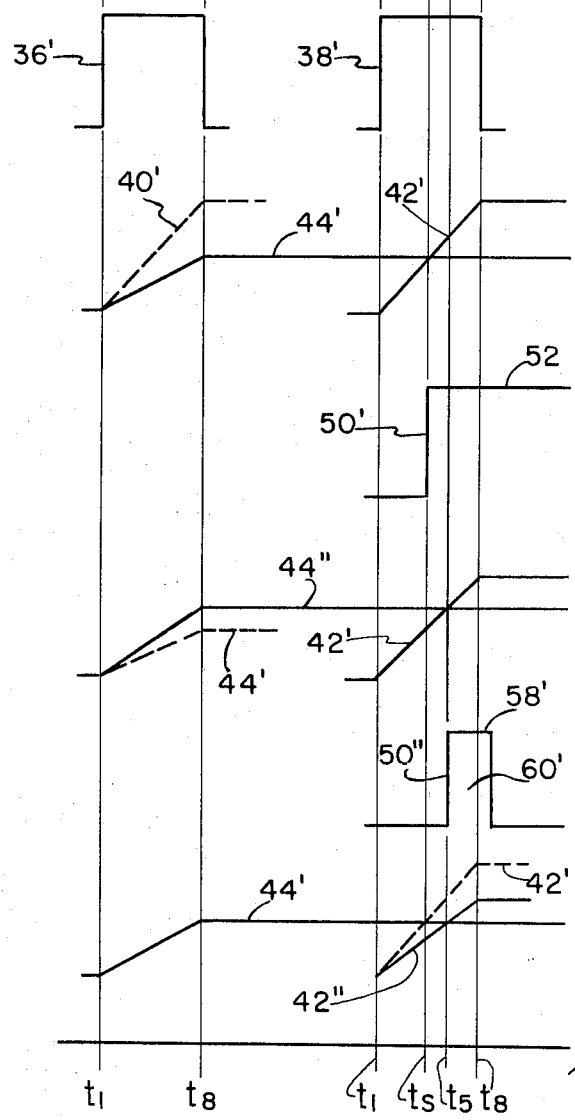

METHOD AND APPARATUS FOR FINDING THE CENTER AMPLITUDE OF EACH PULSE OF A TRAIN OF RANDOM AMPLITUDE ASYMMETRIC PULSES

BACKGROUND OF THE INVENTION

This invention concerns the measurement of microscopic particles and is directed toward improving the measuring accuracy of particle analysis according to the well known teachings of the Coulter principle of electronic particle analysis. The Coulter principle is set forth basically in U.S. Pat. No. 2,656,508 and has been the subject of numerous improvements over the past twenty years. U.S. Pat. No. 3,259,842 describes the commercialized "Coulter Counter" Model B product.

According to the Coulter principle, when a microscopic particle in suspension in an electrolyte is passed through an electrical field of small dimensions approaching those of the particle, there will be a momentary change in the electric impedance of the electrolyte in the ambit of the field. This change of impedance diverts some of the excitation energy into the associated circuitry, giving rise to an electrical signal. Such signal has been accepted as a reasonably accurate indication of the particle volume for most biological and industrial purposes. Apparatus embodying the teachings of U.S. Pat. No. 2,656,508 has been used to count and size particles in biological fluids, industrial powders and slurries, etc.

This invention specifically concerns a pulse center finder useful with a Coulter apparatus in which the excitation of the field is achieved by means of unidirectional or low frequency power sources or radio frequency power sources.

In commercial versions of the Coulter particle analyzing apparatus, the electric field of small dimensions has been formed commonly by a microscopic right cylindrical passageway or aperture, as it is known, between two bodies of liquid in which the particles to be studied are suspended. The electrical excitation energy is coupled to these bodies by means of electrodes respectively located in the liquid bodies, the aperture being formed in an insulating wall between the bodies. The suspension is caused to flow through the aperture carrying the particles with the flow and giving rise to the electric signals produced by the momentary changes in impedance caused by the respective particles as they pass through the aperture. The electric field is concentrated in the aperture and normally comprises an electric current flowing through the aperture along with the physical flow of suspension.

By counting the signals produced, one can count the particles passing through the aperture. By discriminating between different pulse amplitudes, one can make size studies. This invention is primarily concerned with size studies, and has, as a very important object thereof, the provision of apparatus which will enable highly accurate particle size data to be achieved.

It has been verified that the electric field halfway through the aperture, being the position most remote from the entrance and exit of the aperture, is most uniform and has the most uniform current distribution for all paths through the aperture. The longer the aperture, the more nearly uniform is the field at this midpoint. At the entrance and exit of the aperture, the current density is greater at the edges of the aperture and correspondingly lesser on the axis of the aperture. This may be explained by pointing out the current paths other than the axial path are supplied from the sides of the aperture as well as straight ahead. The lower current density on the axis at the entrance and exit results in a lower instantaneous signal than is the case for particles entering the aperture and leaving it on other paths. In other words, the current density at the corners of the aperture is greater than at the axis.

U.S. Pat. No. 3,668,531 discusses the current density phenomenon and teaches circuitry for detecting and measuring a particle when it is halfway through the aperture path. Such circuitry effectively measures the particle pulse amplitude at its center, regardless of pulse peaks before, at, or after the pulse center. Such circuitry has been identified as a "center-finder."

Another phenomenon that affects the accurate measurement of particles according to the Coulter principle is electrolyte and particle velocity relative to different portions of the aperture path. The velocity of electrolyte flow, and hence the velocity of particles also, is somewhat greater on an axial path than on paths closer to the edges of the aperture or paths which are off-center, because the liquid does not have to change direction when it goes through the axial center of the aperture. The resistance to flow is a minimum on the axis since it is surrounded by a moving sheath of liquid having substantially the same velocity.

Because of flow velocity variations, the pulse durations are variable. Yet also, since the particles flow through the aperture in randomly spaced times, the pulse train has an equally random spacing between pulses.

Because of the variations in current density in and around the aperture path, the particle-pulses easily can differ in shape from each other and from the idealized bell shaped pulse, generally identified with the output from a Coulter type of scanner. In reality the pulses are asymmetric and have a peak which not only is not at the center of the pulse, but the peak amplitude is not a fully accurate measure of the particle volume.

In the prior art are many circuits and systems which operate upon and analyze pulse trains. Included among the prior art are circuits specifically concerned with locating the center of a pulse. Two such prior art circuits are set forth in U.S. Pat. Nos. 2,996,624 and 3,461,389. Unfortunately, the prior art circuits only can operate upon a train of pulses having certain parameter constants, such as constant amplitudes, and/or constant durations, and/or constant pulse repetition rates, and/or pulse shape symmetry. As above explained, the particle-pulse train generated by a Coulter type of particle analyzer does not possess any of those named constants and therefore, with the exception of the earlier cited circuits of Hogg U.S. Pat. No. 3,668,531, there is no known prior art that meets the needs of locating the time at which a particle passes through the center of a Coulter type of scanning aperture.

The circuitry of Hogg U.S. Pat. No. 3,668,531 itself has limitations. An important part of the accuracy of that circuitry depends upon a scale factor adjustment, the setting of which is very imperical and depends largely upon the dimensions of the scanning aperture and flow rate of the suspension of the particles therethrough. Accordingly, if the scanning aperture is changed, a situation that often arises due to analysis requirements or even breakage of the aperture tube, the scale factor adjustment would have to be reset by a skilled technician. Even if the replacement aperture is of the "same" size, there tends to be very slight size and shape differences which might generate sufficiently large enough differences in the electrical response to at least require an evaluation of the proper setting of the scale factor adjustment. Hence, the elimination of aperture size dependence in a pulse center finder is a desirable goal.

SUMMARY OF THE INVENTION

This invention teaches pulse center finding method and apparatus which overcomes the prior art limitations in that asymmetric pulses of random amplitude, random duration and random repetition rate are individually examined and their amplitude ascertained at their symmetry center or at any other specific time. Each pulse is received by the combination of a pulse stretcher and an attenuator which generates a signal level which is a specific percentage of the amplitude of the incoming pulse. A 50 percent level is effective. The incoming pulse also is received by a pair of delay elements that define a pair of time-spaced parallel channels. Each channel contains a comparator and an integrator. The comparator compares the delayed pulse with its attenuated counterpart level and generates a square wave that then is integrated. The first in time of the integrated outputs is attenuated an amount proportional to the time at which the pulse amplitude is to be ascertained. If the pulse center is to be located, the first integral signal is attenuated by 50 percent. The two time spaced integral outputs are compared and at the time their levels are equal the comparator generates a strobe signal which picks off the original pulse amplitude at the desired "center" time.

BRIEF DESCRIPTION OF THE DRAWINGS

FIG. 1 is a diagram illustrating three particle-pulses resulting from three particles of equal volume passing through the same scanning aperture along three different paths;

FIG. 4 is a diagram comprising a series of wave forms of a particle-pulse and derived signals and pulses at various points in the schematics of FIGS. 2 and 3 during the operation thereof.

DETAILED DESCRIPTION OF THE PREFERRED EMBODIMENTS

Figure 2:
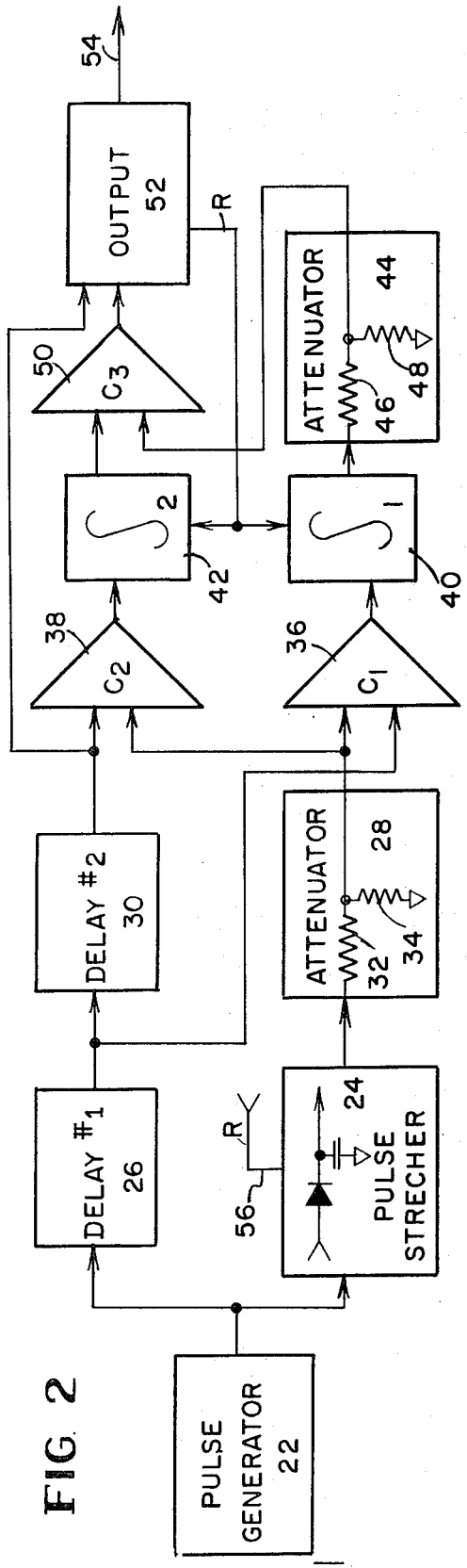
FIG. 2 is a schematic diagram of a pulse center finder apparatus according to the invention.

FIG. 1 shows three particle-pulses 10, 12 and 14 greatly magnified and somewhat stylized for purposes of emphasis of the problems which the invention seeks to overcome. These three pulses are to represent three different particles of equal volume which have traversed a typical Coulter type of scanning aperture along three different paths. In theory all three of these pulses should have the same shape and duration. They should be bell shaped with a single rounded peak at their time duration center $t_4$. Such single and centered peak should have an amplitude that is proportional to the volume of the particle.

As easily seen from FIG. 1, none of the pulses 10, 12 or 14 meet all of the just stated criteria. The reason for the various pulse shapes is explained in detail in Hogg U.S. Pat. No. 3,668,531 and will not be discussed herein. The pulse 10 does represent a realistic shape of the ideal pulse which is generated by a Coulter type of scanner. Its peak 16 accurately represents the volume of the particle that caused its generation. The peak 16 occurs at the time $t_5$ which is approximately 60 percent of the duration of $t_o$ to $t_9$. At the time $t_5$, the particle producing the pulse 10 is one-half way through the scanning ambit or field of a Coulter type of scanning aperture.

The pulse 12 has two peaks 18 and 20, both of which are much higher than the peak 16, even though the highest amplitude of the pulse 12 theoretically should not exceed the amplitude 16. Even the lowest point between the peaks 18 and 20 of the saddle shaped pulse 12 has too high an amplitude to precisely represent the volume of its particle. Nevertheless, the amplitude of the pulse 12 between the times $t_4$ and $t_5$ is far more accurate than the particle volume measurement at any other time. Similarly, the generally flat-topped pulse 14 has an excessive amplitude, but one which has a small valley just subsequent to the symmetry time $t_S$.

If one were to select a time at which most particle pulses had an amplitude most accurately representing the volume of their particles, that time would lie between $t_4$ and $t_5$. Since the pulse 12 is a rather exaggerated example, the center amplitude time or the time at which the pulses best represent the particle volume is closer to $t_5$ than $t_4$. The next to be described apparatus of FIGS. 2 and 3 enables the selecting of any center amplitude time and the obtaining at that time of the center amplitude, with the times $t_S$ and $t_5$ specifically being illustrated in the wave forms of FIG. 4.

A pulse generator 22 is shown in FIG. 2 as the source of pulses which are asymmetric, such as the pulses 10, 12 and 14, and are random in amplitude. One such pulse generator would be a Coulter type of particle scanning aperture arrangement. The pulses would have random amplitudes that are proportional to the volumes of their respective particles. Typically, several thousand particle-pulses are generated per second, with a random spacing between pulses. The output of the pulse generator is coupled to a pulse stretcher 24 and a first delay element 26. The output of the pulse stretcher 24 is coupled to an attenuator 28, and the output of the first delay element 26 is coupled to a second delay element 30.

With reference to FIGS. 2 and 4, if the pulse to be analyzed is saddle shaped, like the pulse 12 of FIG. 1, it will appear in the apparatus of FIG. 2 three times, once at the outputs of each the generator 22, the first delay element 26 and the second delay element 30. FIG. 4 illustrates such three saddle shaped wave forms as 22', 26' and 30'. The pulse stretcher 24 can be of the typical type which follows the pulse 22' to its maximum amplitude and holds and stretches such amplitude value, as represented by the dashed line 24'. The attenuator 28 can be a simple voltage dividing arrangement having resistors 32 and 34. If these resistors are of equal value, then the attenuator will reduce the stretched pulse amplitude 24' to one-half or 50 percent of its amplitude, as shown by the wave form 28' which passes through the pulses 22', 26' and 30'. Regardless of the particle volume and the corresponding amplitude of its particle-pulse, the amplitude of the wave form 28' always will be the same known percentage of the maximum amplitude of each particle-pulse. Thus, by employing the combination of the pulse stretcher 24 and the attenuator 28, the invention becomes independent of random amplitudes. If the pulse 22' had been clipped or the wave form 28' held at a specific value independent of the amplitude of its specific particle-pulse, then the amplitude level 28' would not be independent of the differences in amplitudes between the many thousands of particle-pulses.

If independence of random amplitude was the only object, then the attenuator could be built to establish the level 28' to lie within a convenient amplitude range for the following circuit elements, and the resulting fixed percentage of maximum amplitude would be a consequence of such a convenient range. However, the attenuator 28 also enables the apparatus to operate upon asymmetric pulses by significantly reducing the asymmetry as seen by the circuit elements subsequent to the attenuator. It has been recognized that asymmetric pulses, especially of the type shown in FIG. 1 and those generated by a Coulter type of scanner, are significantly more symmetric when measured with respect to their half-amplitude. For example, the pulse 10 in FIG. 1 is at its half-amplitude at the times $t_3$ and $t_6$, with the peak 16 lying much closer to the midpoint between $t_3$ and $t_6$ than the 60 percent value that $t_5$ has with respect to the times $t_o$ and $t_9$. In like manner, the pulse 12 lies above its half-amplitude between the times $t_1$ and $t_8$ and is more symmetric around time $t_S$. The same can be said for the pulse 14 as it is seen between the times $t_2$ and $t_7$, its half-amplitude crossing points.

The output 28' from the attenuator 28 is coupled to one input of first and second comparators 36 and 38. The output 26' from the first delay element 26 is coupled to the other input of the first comparator 36; whereas, the output 30' from the second delay element 30 is coupled to the other input of the second comparator 38. In a well known manner, the comparators have an output which changes its level or state when the two inputs are equal. In the present example, as stated with reference to FIG. 1, the pulse 12 is at its half-amplitude at the times $t_1$ and $t_8$; hence (disregarding the imposed time delays) the comparators 36 and 38 both will switch their output states at the times $t_1$ and $t_8$, as shown in FIG. 4 with respect to their respective signals 36' and 38'. Between the times $t_1$ and $t_8$, these outputs will be constant. If the comparators 36 and 38 are designed to operate with fast transition times, the signals 36' and 38' will be square waves, as shown. The comparators also are to be matched so that the amplitudes of the signals 36' and 38' are the same; and since the times durations of both signals 36' and 38' are equal, the areas under these signals will be equal.

Although FIG. 4 shows the pulses 22', 26' and 30' delayed by amounts to fully separate them, this is not necessary and, in fact, would be wasteful of time for the processing of many thousands of particles for any one sample. The delay imposed by the element 26 need be only long enough for the pulse 22' to have reached its peak before the delayed pulse 26' reaches its half-amplitude point at time $t_1$. Approximately one-half the maximum pulse duration should be enough of a delay for the first delay element 26. The delay duration for the second delay element 30 is to be at least one-half the duration of the signal 36'; i.e. $(t_8 - t_1)/2$. This lower limit will become understood from the subsequent description.

First and second integrators 40 and 42 are coupled to receive, respectively, the identical outputs 36' and 38' from the first and second comparators and generate typical wave forms 40' and 42'. An attenuator 44, having resistors 46 and 48 or the equivalent attenuating factor determining circuitry, receives the output 40' from the first integrator and produces the attenuated signal 44'. If the resistors 46 and 48 are of equal value, the signal 44' will have one-half the amplitude of the wave form 42'. A third comparator 50 is coupled to receive the attenuated signal 44' and the output 42' from the second integrator 42 and will produce a signal output change of state 50' at the time that its inputs 42' and 44' have the same amplitude. If the amplitude of the signal 44' is one-half of that attainable by the wave form 42', because of the one-half attenuation by the attenuator 44, and the integrators are integrating at the same rate, then these amplitudes will be equal at the time $t_S$, which is one-half the duration of the signal 38' and also is $(t_8 - t_1)/2$.

The output 50' has been generated at the symmetry center $t_S$ of the pulse 22' and can be used to strobe that pulse, or in fact its delayed counterpart 30' at the delayed time $t_S$, to pass the center amplitude 52' for subsequent particle volume analysis. To accomplish the center amplitude acquisition, the output from the second delay element 30 is coupled directly to an output circuit 52 that is coupled to receive the strobe signal 50' from the third comparator 50. The output circuit 52 can include a sample and hold circuit, which will follow the amplitude of the input pulse 30' until strobed by the signal 50' at time $t_S$; thereupon, the amplitude 52' at time $t_S$ will be held and passed to the output 54 of the center finder apparatus. The output circuit would be capable of generating a reset signal for itself if necessary and couple reset signals on a line 56 to all other circuit elements requiring same.

Rather than strobe the particle-pulse at its symmetry center $t_S$, any other time can be selected, such as the aperture path center time $t_5$, at which time the pulse 30' has an amplitude 58'. To alter the strobing time, one or the other, or both of the integral signals can be adjusted to change the time at which their amplitudes are equal. If the attenuator 44 is designed to attenuate the integral signal 40' to be more than one-half amplitude, a signal 44'' can result and will be crossed by the integral ramp 42' at the time $t_5$ and thereby cause the third comparator 52 to generate its strobe signal 50'' at the time $t_5$, when the pulse 30' is at its amplitude 58'. The output circuit can include a one shot multivibrator (univibrator) and an analog switch that receives the pulse 30' and generates a signal 60' having the desired amplitude 58'.

The strobe time also can be altered by a change in the operation of the second integrator 42 to change its slope. For example, by increasing the charging time of the integrator 42, you can sufficiently decrease the slope of 42' to yield the ramp signal 42'', thus the signals 44' and 42'' can be made to be equal at a chosen time, such as $t_5$, without any changing of the attenuator 44.

The operation of the center finding method and the apparatus of FIG. 2 now should be understandable. The delay elements 26 and 30 developed a pair of time offset channels in which the first and second comparators 36 and 38 and the respective integrators 40 and 42 operated to produce signals which had equal amplitudes at the "center time," for generating an amplitude strobing signal.

It will be appreciated that the term "center time" and "center amplitude" encompasses any choice time and the amplitude selected at such chosen time according to the method and apparatus of the invention.

In the foregoing description, the attenuation function by the attenuator 44 was placed subsequent to the integration by the first integrator 40. Such sequence was primarily for convenience of disclosure. Those skilled in the art will recognize that attenuation can be accomplished before integration, so that the square wave 36' as seen by the integrator 40 would have a reduced amplitude and thus a smaller area for integration. One simple way of implementing such result would be to have a source of a D.C. reference level coupled between the output of the first comparator 36 and the integrator 40. The value of the D.C. reference level would be the desired attenuation level, such as that of signals 44' or 44'', and would be coupled to the integrator 40 during the change of the output state of the comparator, between the times $t_1$ and $t_8$.

Although the earlier description of the generation of the square waves 36' and 38' referred only to the operation of the comparators 36 and 38, a practical manner of determining the amplitude of these square waves would be to have the comparators strobe a known D.C. level.

Figure 3:
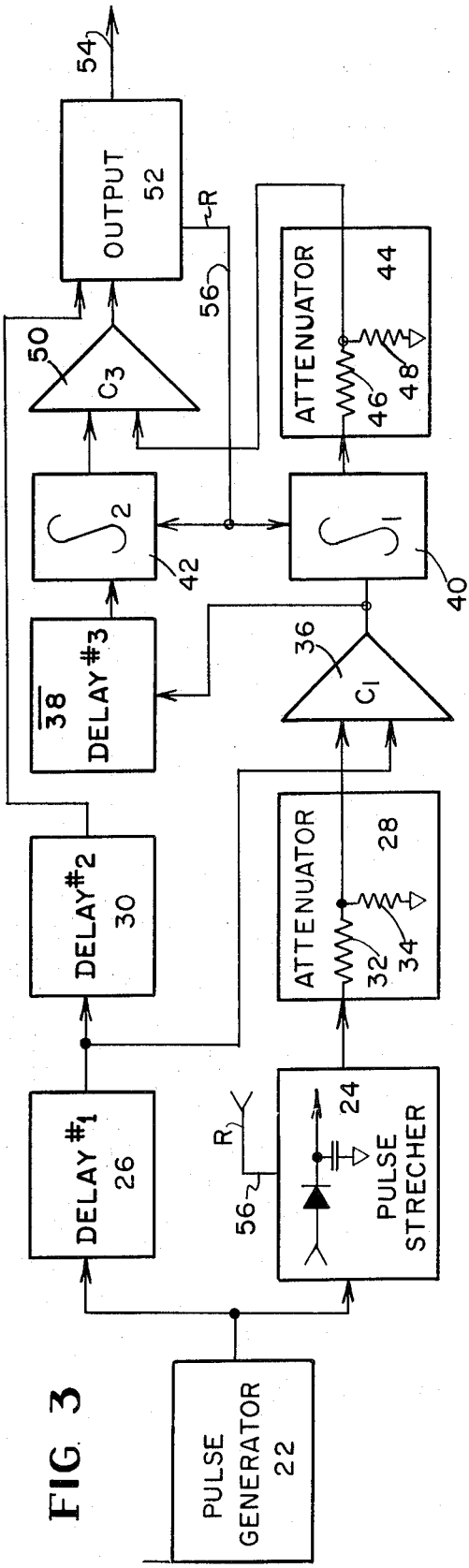
FIG. 3 is a schematic diagram of a slightly modified embodiment of a pulse center finder according to the invention.

FIG. 3 illustrates a simple modification to the circuit of FIG. 2, but does not modify the wave forms of FIG. 4. In place of the second comparator 38, the FIG. 3 embodiment contains a third delay element 38, having its input coupled only to the output of the first comparator 36. Constructed in this manner, the first comparator 36 will be the originating source for both of the signals 36' and 38'. Because of the first rise time of the output from the comparator 36 into the third delay element 38, an analog delay element might produce undesirable "ringing"; hence, a digital delay element $\overline{38}$ might be advisable.

It is believed that the hereinabove description will enable those skilled in the art to understand and practice the method and apparatus according to the invention and if necessary make modifications thereto to meet specific environmental or pulse source needs without departing from the scope of the invention as claimed hereinafter.

What is claimed and sought to be protected by United States Letters Patent is:

1. A method for finding the center amplitude of input pulses which are both asymmetric and of random amplitude, comprising the steps of: attenuating each input pulse a fixed percentage of its original amplitude, establishing a pair of time offset parallel channels for receiving the input pulse such that the two channels in combination can contain two derived pulses from each input pulse, comparing in each channel the original with the attenuated amplitudes of each derived pulse, deriving from such comparing two integratable signals that are related to each other in area and are time offset, one signal being in each channel, integrating separately the two signals, forming from the integration signals two wave forms which have different magnitudes, the smaller magnitude wave form being in the channel which is earlier in time and, the two wave forms, by virtue of time offset, intersecting at a center time useable for strobing the input pulse for obtaining its center amplitude.

2. The method according to claim 1 in which said step of attenuating the input pulse is accompanied by stretching the input pulse at a level of amplitude which is a fixed percentage of its maximum amplitude, during said comparing said level intersecting the input pulse at two points between which the input pulse has less asymmetry than the input pulse possesses, thereby causing the two derived signals to be more symmetric with respect to the input pulse.

3. The method according to claim 2 in which the attenuation level is fifty percent of the amplitude of the input pulse.

4. The method according to claim 1 which includes the step of strobing the input pulse at the center time and obtaining its center amplitude.

5. The method according to claim 4 including the step of employing at least one of said steps of forming and integrating to determine the time of intersection of the two wave forms.

6. The method according to claim 5 in which the time of intersection and thus strobing time is determined to be approximately at sixty percent of the duration of the input pulse.

7. The method according to claim 1 in which said deriving causes the two signals to encompass the same area, and forming of at least one of the two wave forms causes said different magnitudes.

8. The method according to claim 7 in which the rates of integrating the two signals are different from each other.

9. A method according to claim 1 in which the parallel channels are established having a time offset at least equal to one-half the duration of one of the derived signals.

10. Apparatus for finding the center amplitude of input pulses which are both asymmetric and of random amplitude, comprising: means for attenuating each input pulse a fixed percentage of its original amplitude, means for establishing a pair of time offset parallel channels for receiving the input pulse such that the two channels in combination can contain two derived pulses from each input pulse, means coupled into said channels for comparing the original with the attenuated amplitudes of each derived pulse, for deriving two integratable signals that are related to each other in area and are time offset, one signal being in each channel, means for integrating separately the two signals and for forming from the integration signals two wave forms which have different magnitudes, the smaller magnitude wave form being in the channel which is earlier in time and, the two wave forms, by virtue of being in respectively different time offset channels, intersect at a center time useable for strobing the input pulse for obtaining its center amplitude.

11. Apparatus according to claim 10 in which said attenuating means is coupled to means for stretching the input pulse at an amplitude level that is a fixed percentage of its maximum amplitude.

12. Apparatus according to claim 10 which includes means responsive to the intersecting of the two wave forms for generating a center time strobe signal.

13. Apparatus according to claim 12 which includes output means coupled to receive the input pulse and the strobe signal for effecting the strobing of the input pulse at the center time and for thereby obtaining the pulse center amplitude.

14. Apparatus according to claim 10 in which at least one of said comparing means and said integrating means includes means for determining the relative difference in the magnitudes of the two wave forms.

15. Apparatus according to claim 14 in which both of said channels separately include said comparing and integrating means and said magnitude difference determining means is in one of said channels.

16. Apparatus according to claim 15 in which said magnitude difference determining means is an attenuator in the channel which is first in time to integrate its integratable signal.

17. Apparatus according to claim 10 in which said attenuating and comparing means comprise the series connection of a pulse stretcher, an attenuator and a first comparator, the first comparator having one input for receiving the stretched and attenuated input pulse and another input for receiving the input pulse delayed for a time at least equal to the time that it takes the attenuated pulse to reach its peak level before the delayed pulse reaches the same level.

18. Apparatus according to claim 17 in which said pulse stretcher, attenuator and first comparator are constructed and arranged to generate one of the integratable signals with a duration the center of which is the symmetry center of the input pulse.

19. Apparatus according to claim 18 in which said comparing means includes a second comparator that also receives the stretched and attenuated input pulse at one input, and there is provided a delay means which couples the input pulse to another input to said second comparator at a time which is at least one-half the duration of the integratable signal later than the delayed input pulse is coupled to said first comparator.

20. Apparatus according to claim 10 which includes as a source of the input pulses a Coulter type of scanning aperture arrangement.

21. Apparatus for finding the center amplitude of each pulse in a train of random amplitude input pulses that are asymmetric, comprising: a source of the input pulses, delay means for generating two quantums of delay and for defining the input end of two time offset parallel channels, input pulse attenuating means and series coupled thereto pulse comparing means, both said delay means and said attenuating means being coupled to receive the input pulses, said comparing means being coupled to the output of said delay means for developing in each said channel an integratable signal two such signals developed from each input pulse, integrating means in both said channels for integrating separately each of said signals to form two time offset wave forms, at least one of said comparing means and said integrating means in at least one of said channels defining the profile of at least one of the offset wave forms such that the two wave forms have different profiles that intersect each other at a point in time, circuit means responsive to said integrating means for identifying said point in time, and output circuit means coupled to receive an input pulse and activated by said identifying circuit means to select the amplitude of the input pulse at said point in time.

22. Apparatus according to claim 21 in which a first of said channels comprises in series connection a first delay element, a first comparator and a first integrator; and the second of said channels comprises in series connection a second delay element, a second comparator and a second integrator; and said delay elements are series coupled.

23. Apparatus according to claim 22 in which said input pulse attenuating means is coupled to pulse stretching means for assisting in the operation of said comparators.

24. Apparatus according to claim 22 in which said first channel includes an attenuator for effecting the difference in wave form profiles.

25. Apparatus according to claim 21 in which said attenuating means is constructed to provide a fixed percentage of attenuation of each input pulse and coact with said comparing means to generate the integratable signal with a time duration center that defines said point in time and effectively reduces the asymmetry of each input pulse as seen by the apparatus.

26. Apparatus according to claim 21 in which said comparing means is a comparator interposed between two delay elements which define said delay means, said comparator having an output to said integrating means in one of said channels and to one of said delay elements, said one delay element having an output to the integrating means in the other of said channels.

27. Apparatus according to claim 21 in which said source of input pulses includes a Coulter type of scanning aperture.

* * * * *

UNITED STATES PATENT AND TRADEMARK OFFICE
CERTIFICATE OF CORRECTION

PATENT NO. : 3,863,160
DATED : January 28, 1975
INVENTOR(S) : Edward Neal Doty

It is certified that error appears in the above—identified patent and that said Letters Patent are hereby corrected as shown below:

In the title page before [22] insert -- [73] Assignee: Coulter Electronics, Inc., Hialeah, Fla.

Signed and Sealed this second Day of December 1975

[SEAL]

Attest:

RUTH C. MASON
*Attesting Officer*

C. MARSHALL DANN
*Commissioner of Patents and Trademarks*